Patented Apr. 17, 1945

2,374,121

UNITED STATES PATENT OFFICE 2,374,121

FABRIC

James Robertson Myles and Donald Whittaker, Northwich, and Francis Joseph Siddle, Manchester, England, assignors to Imperial Chemical Industries Limited, a corporation of Great Britain No Drawing. Application July 28, 1942, Serial No. 452,672. In Great Britain November 8, 1940

1 Claim. (Cl. 117—7)

This invention relates to the treatment of fabrics and more particularly to the tautening of fabrics stretched over light structures such as aeroplane wings. The process and the solutions used therein are referred to in this specification as doping and dopes.

A good dope is a solution from which, by evaporation of the solvent, films can be obtained which shrink during formation and which have a high tensile strength and a low extension under load. The film should also be smooth and light-weight, non-inflammable, flexible at low temperatures and resistant to other conditions of exposure. The solution used must be of sufficient concentration and suitable viscosity for ready application.

According to the present invention, a fabric is treated for the purpose referred to by applying to the fabric by the customary methods of doping, a solution in a suitable volatile solvent or solvent mixture which contains the material obtained by chlorinating solid polymers of ethylene at a temperature below about 60° C. to a chlorine content of about 60–70% by weight, and preferably also one or more substances which inhibit the liberation of free hydrogen chloride from chlorinated polythenes under the conditions of exposure to light and/or heat, and if desired, other film-forming materials and/or plasticisers. A further feature of the invention comprises the provision of a dope for carrying out the aforesaid process, the said dope consisting of a solution containing chlorinated solid polythenes having a chlorine content of 60–70% by weight made by chlorination at a temperature below 60° C., and, if desired, other constituents.

In treating fabrics by these dopes, it is essential that the first coat shall penetrate the fabric and thus adhere firmly to it. Subsequent coats may be applied to the surface. Thus we prefer to brush the first coat of dope into the fabric, and subsequent coats may be sprayed, brushed or otherwise applied as convenient.

The polymers of ethylene can be halogenated by treatment with one or more halogens in the manner disclosed in U. S. Patent 2,183,556. The chlorinated polymers of ethylene to which this invention relates are made from normally solid polymers of ethylene of mean molecular weight above 2000, preferably above 8000, as measured by the Staudinger solution viscosity method. The chlorination is carried out by treatment of solid polymers of ethylene in presence of an inert liquid medium at a temperature below about 60° C. with chlorine or substances capable of introducing chlorine. The most suitable inert liquid medium is carbon tetrachloride, but other chlorine-stable liquids may be employed.

Chlorinated polymers of ethylene of low chlorine content do not act alone as dopes because they are not sufficiently soluble in the preferred solvents and solvent mixtures, and the extension under load is too great. Chlorinated polymers of ethylene prepared at high temperatures do not act alone as dopes because the materials creep under load. Thus when a fabric under tension is impregnated with either of these materials alone the tautness of the fabric is not improved.

Mixtures of two or more chlorinated polymers of ethylene such as are described and claimed in U. S. Patent 2,268,1C2 may be employed when their mean chlorine content is high, preferably about 60–70% by weight, and when the chlorinated polymers of ethylene have been prepared at temperatures below 60° C.

These chlorinated polymers of ethylene have a slight tendency to decompose when exposed for long periods to heat and light, with evolution of hydrogen chloride which may impair the fabric. For this reason we prefer to incorporate in the chlorinated polymers of ethylene used in the present invention a small amount of one or more materials which inhibit this deterioration. These dopes generally contain pigments suspended in the solution or dyes dissolved or suspended in the solution which screen the doped fabric from the light and thus prevent the light from causing decomposition of the dope. The same purpose may also be achieved by incorporating such materials as are described and claimed in application No. 373,380, filed January 6, 1941, now U. S. Patent 2,316,481. When the fabrics are to be exposed to elevated temperatures, we also prefer to add one or more substances which inhibit the decomposition of chlorinated polymers of ethylene at elevated temperatures, such as those described in application 410,592, filed September 12, 1941, or ethylene oxide derivatives which have a boiling point above 100° C. such as phenyl glycide ether and β naphthyl glycide ether. It is sometimes desirable also to obtain a doped fabric of increased flexibility and this can be done by incorporating in the chlorinated ethylene polymer dope a small amount of a plasticiser such as tricresyl phosphate or dibutyl phthalate.

We may also incorporate in the chlorinated polymers of ethylene substantial amounts of other materials, in particular high molecular weight organic compounds of similar physical properties and capable of forming suitable films as already defined. Such materials include chlorinated rubber, polymethyl methacrylate, polyvinyl derivatives and the like. Thus, in addition to chlorinated polymers of ethylene, the dope may contain pigments, light stabilisers, heat stabilisers, plasticisers, other film-forming materials or any or all of these.

Suitable solvents have a boiling point below 200° C. and a melting point below 10° C., and we prefer to use aromatic compounds such as benzene, toluene, xylene or chlorinated hydrocarbons, or ketones excluding acetone, or esters such as ethyl and amyl acetates, or mixtures containing them. Acetone and petroleum hydrocarbons, solvent naphtha and the like, may also be added advantageously as diluents to the solvent.

A convenient solution may contain 5-20% by weight of chlorinated polymers of ethylene and have a viscosity of 1-6 poises, but these limits are not critical and vary with the particular materials and methods of application employed. It is desirable to use as little dope as will effect tautening and this usually amounts to about 1-5 ounces per square yard.

The invention is illustrated but not restricted by the following examples:

*Example 1*

100 g. of chlorinated ethylene polymer containing 65% by weight of chlorine, made by chlorinating an ethylene polymer of mean molecular weight 14,000 in suspension in carbon tetrachloride at a temperature of 20°-30° C., was milled in a ball mill at room temperature with 10 g. of finely divided ferric oxide, 1 g. phenyl salicylate, 2 g. of lead tartrate and 200 ccs. of a mixture of equal volumes of benzene and toluene. To the resulting thick paste was added gradually 270 ccs. benzene and 270 ccs. toluene and 185 ccs. of acetone. Between each addition of the liquids, ball milling was continued in order to give a fine suspension of the pigment in the dope.

The resulting dope was a smooth liquid, of viscosity about 2 poises at 20° C., suitable for application to a properly prepared fabric by brushing or spraying.

A test panel was prepared by stretching standard linen aeroplane fabric on a 1 foot square metal frame, with a tension of 2 lbs. per inch of warp thread and 1 lb. per inch of weft thread, fixing the fabric to the frame by strips held by screws to the sides of the frame before removing the weights. The tautness of the fabric was measured by placing a steel disc, 3" in dia., and weighing half a pound on the surface of the fabric and measuring the depression caused by this load by means of a suitable gauge. It was found that before doping the fabric was depressed 3.00 mms. by application of the load.

Two coats of the pigmented solution of the chlorinated ethylene polymer were applied by brushing and in each case the amount of halogenated ethylene polymer applied was 1 oz./sq. yd. The first coat was allowed to dry before the second coat was applied.

The tautness of the fabric was measured 24 hours after the application of the second coat, and the depression was found to be only 1.05 mms.

The coated fabric was non-inflammable and had a smooth waterproof surface, flexible at low temperatures and capable of being heated to 50° C. for extended periods without material loss of tautness.

*Example 2*

100 g. of chlorinated ethylene polymer containing 68% of chlorine by weight, made by chlorinating an ethylene polymer of mean molecular weight 15,000, was stirred cold with 1 g. of β naphthyl glycide ether and 2 g. of phenyl salicylate and 900 ccs. of a mixture of equal volumes of benzene, toluene and ethyl acetate.

The resulting dope was tested on fabric by the method given in Example 1. The depression of the undoped fabric under the Standard load was 3.15 mms.; after doping and drying the depression was reduced to 0.85 mm.

*Example 3*

100 g. of chlorinated ethylene polymer containing 62% of chlorine by weight made by chlorinating an ethylene polymer of mean molecular weight 12,000, while maintaining the temperature below 60° C., was stirred cold with 900 ccs. of a mixture of equal volumes of toluene, methylethyl ketone and ethyl acetate. The resulting dope was tested on a fabric by the method given in Example 1. The depression of the undoped fabric under the Standard load was 3.2 mms.; after doping and drying the depression was reduced to 1.2 mms. After exposing the test panel in the open air for 3 months, the depression was 1.3 mms.

We claim:

An article of manufacture comprising a frame and a tautened flexible fabric attached to and covering said frame, said tautened fabric being impregnated and coated with the dried film of a solution in organic solvent boiling below 200° C., and melting below 10° C. of the chlorinated ethylene polymer resulting from chlorination of solid ethylene polymer at a temperature below 60° C., to a chlorine content of 60% to 70% by weight.

JAMES R. MYLES.
DONALD WHITTAKER.
FRANCIS JOSEPH SIDDLE.